United States Patent
Fedorowicz et al.

(10) Patent No.: US 6,247,463 B1
(45) Date of Patent: Jun. 19, 2001

(54) DIESEL ENGINE CRANKCASE VENTILATION FILTER

(75) Inventors: Jeffrey A. Fedorowicz, Madison, WI (US); Michael B. Lanius, Cookeville, TN (US); Lawrence P. Tracy; Raymond C. Shute, both of Columbus, IN (US); Mark V. Holzmann, Stoughton, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/387,819

(22) Filed: Sep. 1, 1999

(51) Int. Cl.[7] ................................................. F02M 25/06
(52) U.S. Cl. ............................................................ 123/572
(58) Field of Search ................................... 123/572, 573, 123/574, 41.86

(56) References Cited

U.S. PATENT DOCUMENTS

| | | | |
|---|---|---|---|
| 3,765,386 | * 10/1973 | Ottofy | 123/573 |
| 4,453,525 | * 6/1984 | Debruler | 123/572 |
| 4,569,323 | * 2/1986 | Okumura | 123/572 |
| 4,602,595 | * 7/1986 | Aoki et al. | 123/41.86 |
| 4,627,406 | * 12/1986 | Namiki et al. | 123/572 |
| 4,723,529 | * 2/1988 | Yokoi et al. | 123/573 |
| 5,277,154 | * 1/1994 | McDowell | 123/573 |
| 5,669,366 | * 9/1997 | Beach et al. | 123/572 |

* cited by examiner

Primary Examiner—Marguerite McMahon
(74) Attorney, Agent, or Firm—Andrus, Sceales, Starke & Sawall, LLP

(57) ABSTRACT

A diesel engine crankcase ventilation filter is provided by a flat low profile filter housing having an inlet receiving oil and air from the diesel engine, an outlet returning air to the engine, a drain returning separated oil to the engine, and a flat panel filter element in the housing receiving the oil and air from the inlet, separating the oil from the air, and passing the air to the outlet and passing the oil to the drain.

32 Claims, 8 Drawing Sheets

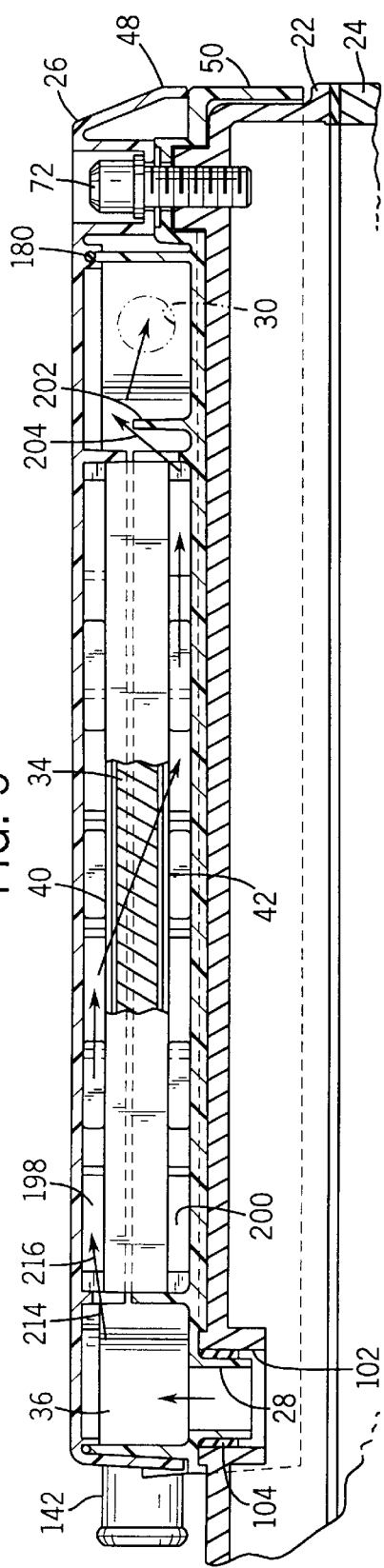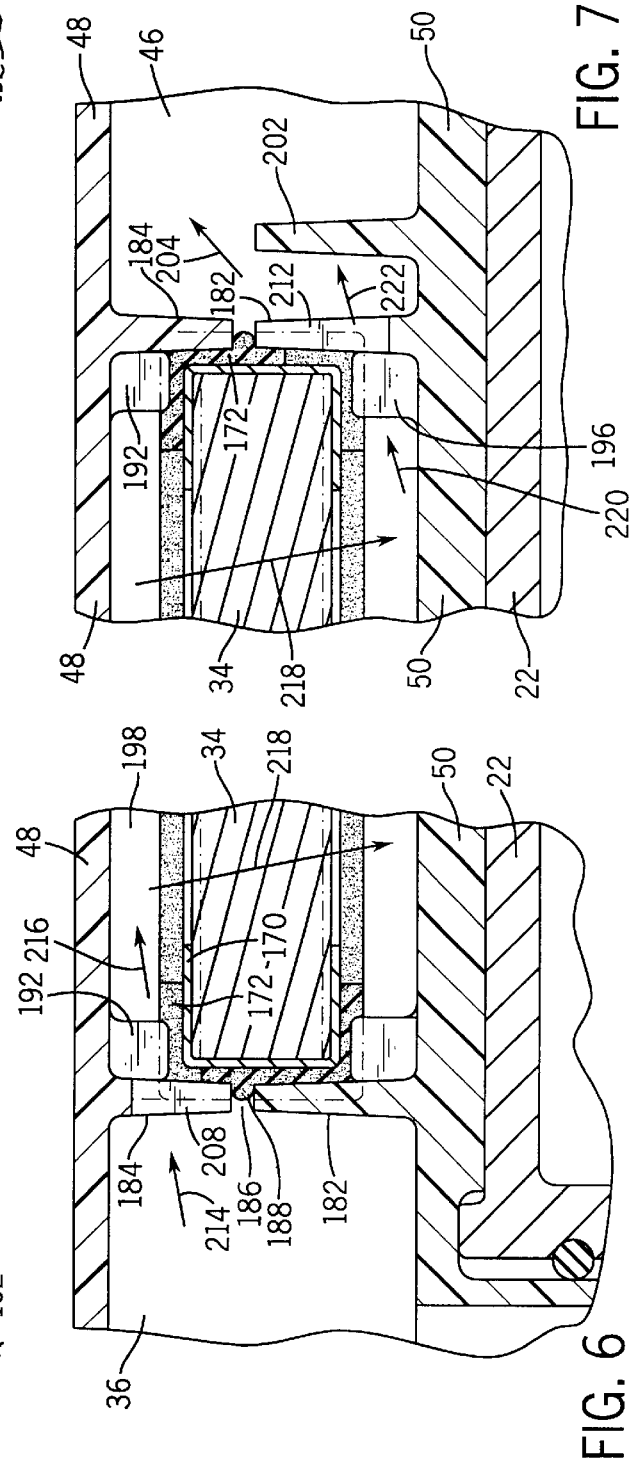

DIESEL ENGINE CRANKCASE VENTILATION FILTER

BACKGROUND AND SUMMARY

The invention relates to crankcase ventilation filters for diesel engines.

Diesel engines have crankcase vents to relieve pressure buildup in the engine. A frequent cause of pressure buildup in the engine is from air leaking past the piston rings into the crankcase. The air that is vented out of the crankcase, also known as blow-by gas or crankcase gas, contains soot and oil mist particles. For many years, the blow-by gas along with the oil and soot was vented to atmosphere through a "road tube" to direct the flow to a desired area such as the ground, or away from specific engine parts. In recent years, metal mesh filters have been used to try and remove some of the larger oil droplets from the blow-by stream. These have had mixed results in the field. There have also been aftermarket products which remove oil mist and soot from engine blow-by gas. These products have been designed for industrial and stationary applications, and are usually too large and bulky for mobile applications.

Over the past few years, for appearance and environmental reasons, there has been motivation to eliminate the "road tube" type of design, and close the crankcase ventilation system. Closing the crankcase ventilation system means returning the blow-by gas back to the incoming combustion airstream to the engine, for example at the air cleaner or turbocharger. If a closed crankcase system is desired, aerosol sized droplets and soots, which for the most part are ignored in an open system, should be removed. This is desired in a closed system in order to avoid adverse effects on various engine components, especially the turbocharger and aftercooler. To do this, a degree of filtration beyond metal mesh is desired.

Packaging a closed crankcase ventilation system in a diesel engine compartment is a problem because of limited space. A closed crankcase ventilation, CCV, system requires routing hoses from the crankcase vent on the engine to the CCV housing, and from the CCV housing to either the dirty side of the air filter or to the turbo inlet of the diesel engine. Furthermore, a drain line needs to be run from the CCV housing back to the oil sump. A "stand alone" CCV system will have certain envelope requirements. For example, in a mid-range diesel engine, e.g. 150 to 300 horsepower, a projected envelope size would be a cylindrical housing of about four inches outer diameter and six to seven inches long plus room for connecting hoses, drain lines and valves. In mobile diesel engine applications, finding this amount of space in a convenient location is a problem.

The present invention provides a diesel engine crankcase ventilation filter addressing and solving the above noted packaging and space problem. The present invention provides a flat low profile crankcase ventilation filter. In preferred form, the invention enables mounting of the flat low profile filter housing directly on the diesel engine valve cover, with minimum space requirements and minimum plumbing requirements.

BRIEF DESCRIPTION OF THE DRAWINGS

FIG. 5 is a sectional view taken along line 5—5 of FIG. 4.

FIG. 6 is an enlarged sectional view of a portion of the inlet side of FIG. 5.

FIG. 7 is an enlarged sectional view of a portion of the outlet side of FIG. 5.

DETAILED DESCRIPTION

Figure 1:
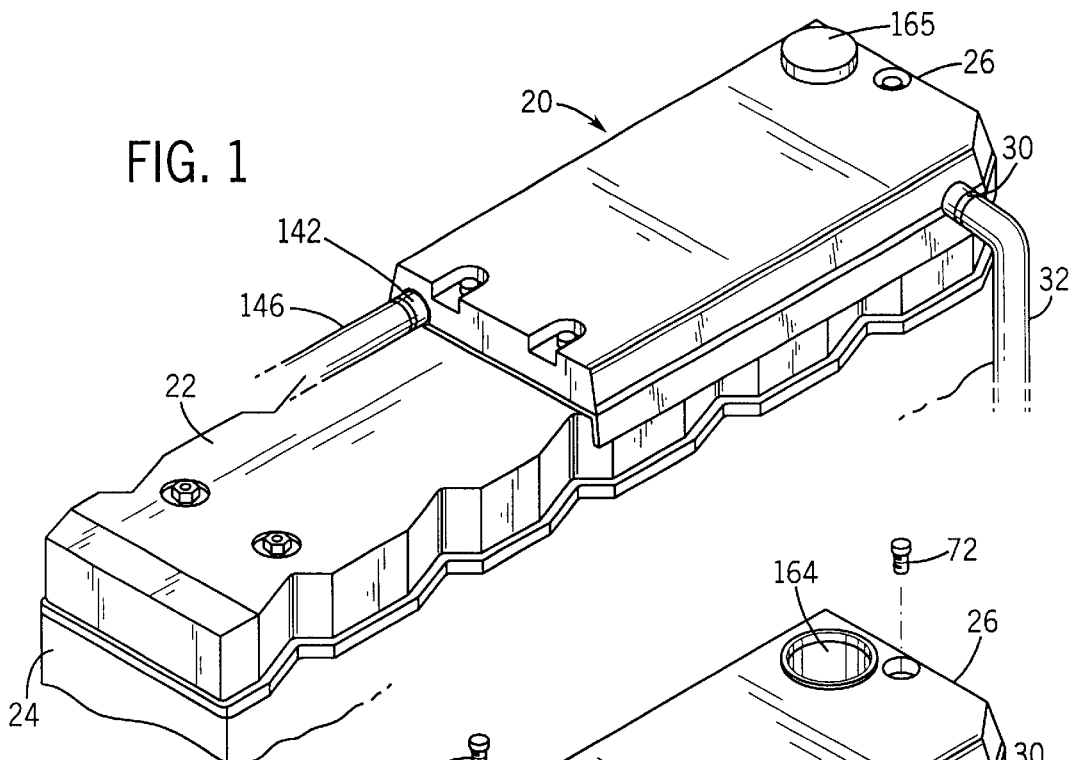
FIG. 1 is a perspective view of a diesel engine crankcase ventilation filter in accordance with the invention.

FIG. 1 shows a crankcase ventilation filter 20, CCV, mounted to valve cover 22 of diesel engine 24. The crankcase ventilation filter includes a low profile filter housing 26, FIG. 2, having an inlet 28, FIGS. 3–5, receiving oil and air from the diesel engine, and an outlet 30 returning air to the diesel engine, for example, by hose 32 connected to either the clean side or the dirty side of the air filter or to the turbocharger. A flat panel filter element 34, FIGS. 3–5, in housing 26 receives the oil and air from inlet 28, separates the oil from the air, and passes the air to outlet 30. As will be more fully described hereinafter, oil and air flow upwardly from the diesel engine through filter housing inlet 28 and are directed by intake plenum 36 around the left end 38 of filter element 34 to the top planar face 40 of the filter element and then flow downwardly through the filter element to the lower planar face 42 thereof, with the oil mist, soot and particles coalescing in the filter, and the air then flows around the right end 44 of filter element 34 and is directed by exit plenum 46 to outlet 30.

Figure 2:
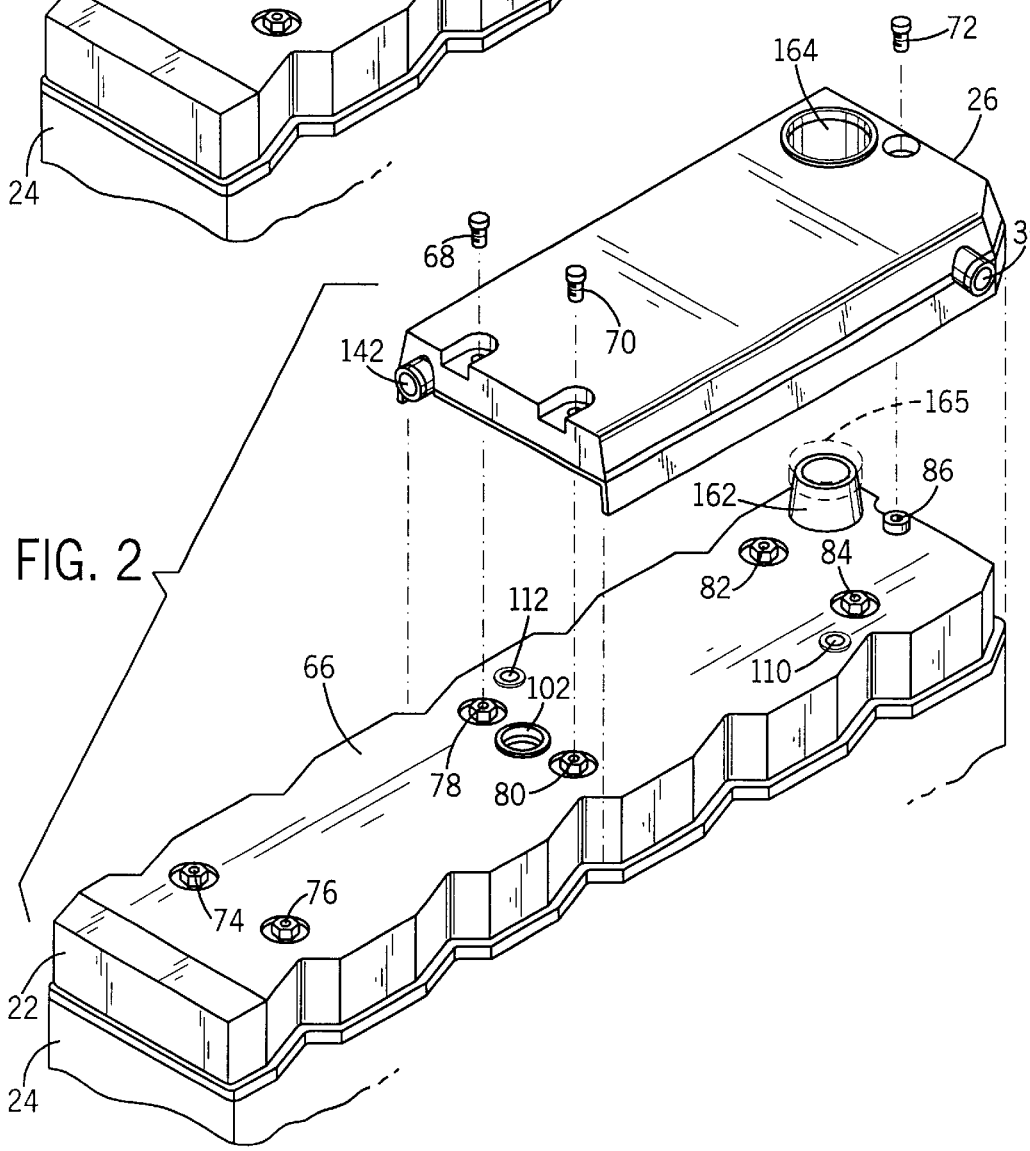
FIG. 2 is an exploded perspective view of the assembly of FIG. 1.
Figure 3:
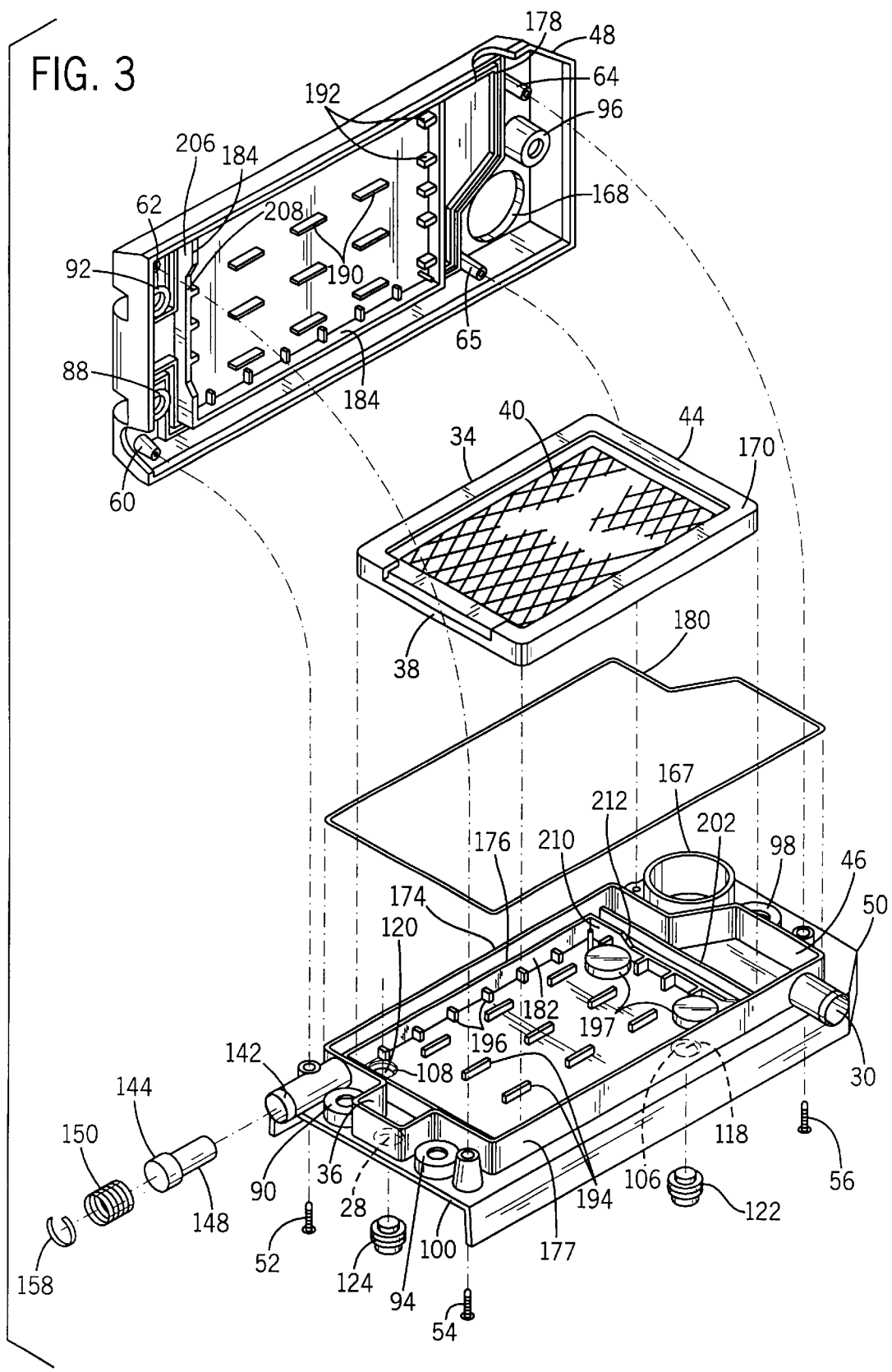
FIG. 3 is disassembled exploded perspective view of a portion of FIG. 2.
Figure 4:
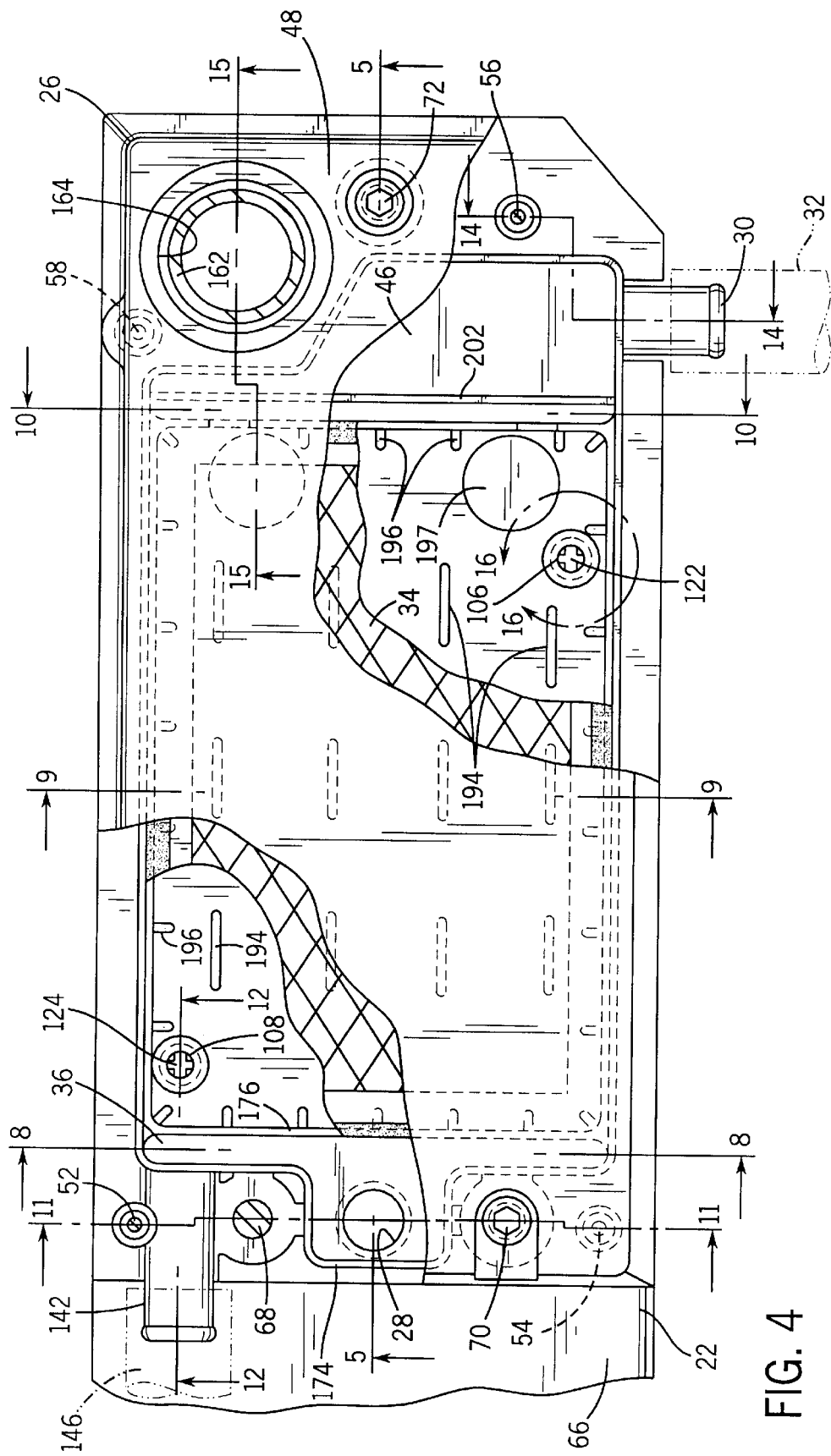
FIG. 4 is a top view partially in section of a portion of FIG. 1.
Figure 8:
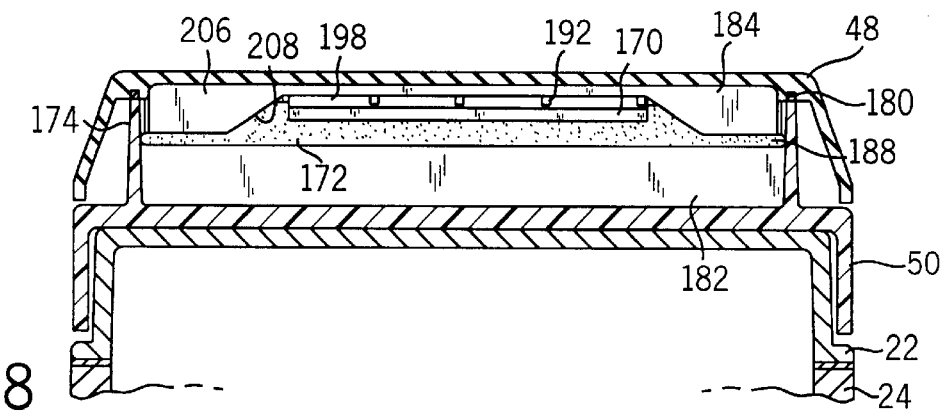
FIG. 8 is a sectional view taken along line 8—8 of FIG. 4.
Figure 9:
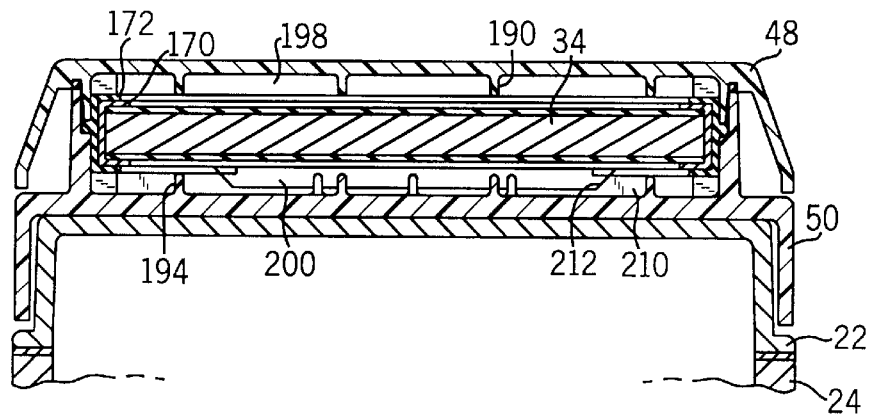
FIG. 9 is a sectional view taken along line 9—9 of FIG. 4.
Figure 10:
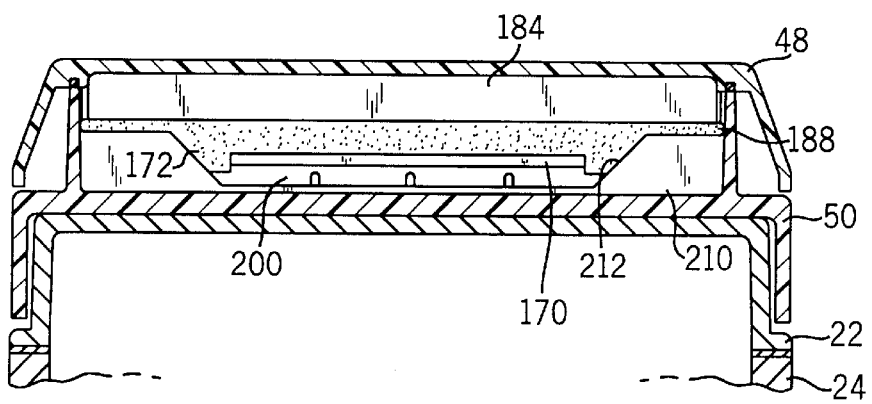
FIG. 10 is a sectional view taken along line 10—10 of FIG. 4.

Housing 26 is formed by upper and lower mating plastic housing sections 48 and 50, FIG. 3, attached to each other by screws 52, 54, 56, 58 extending upwardly through lower housing section 50 and threaded into respective formed bosses 60, 62, 64, 65 in upper housing section 48. Assembled housing 26 is mounted on top of the diesel engine, preferably on upper planar surface 66 of valve cover 22, by bolts 68, 70, 72, FIG. 2. Valve cover 22 is mounted to engine 24 by bolts 74, 76, 78, 80, 82, 84. Bolts 68 and 70 are threaded into the heads of bolts 78 and 80. Bolt 72 is threaded into boss 86 of valve cover 22. Bolt 68 extends through alignment and spacing bosses 88 and 90 in upper and lower housing sections 48 and 50, respectively. Bolt 70 extends through alignment and spacing bosses 92 and 94 in upper and lower housing sections 48 and 50, respectively. Bolt 72 extends through alignment and spacing bosses 96 and 98 in upper and lower housing sections 48 and 50, respectively. The plane of flat panel filter element 34 and the plane of flat low profile filter housing 26 and the plane of upper planar surface 66 are all parallel and horizontal.

Figure 11:
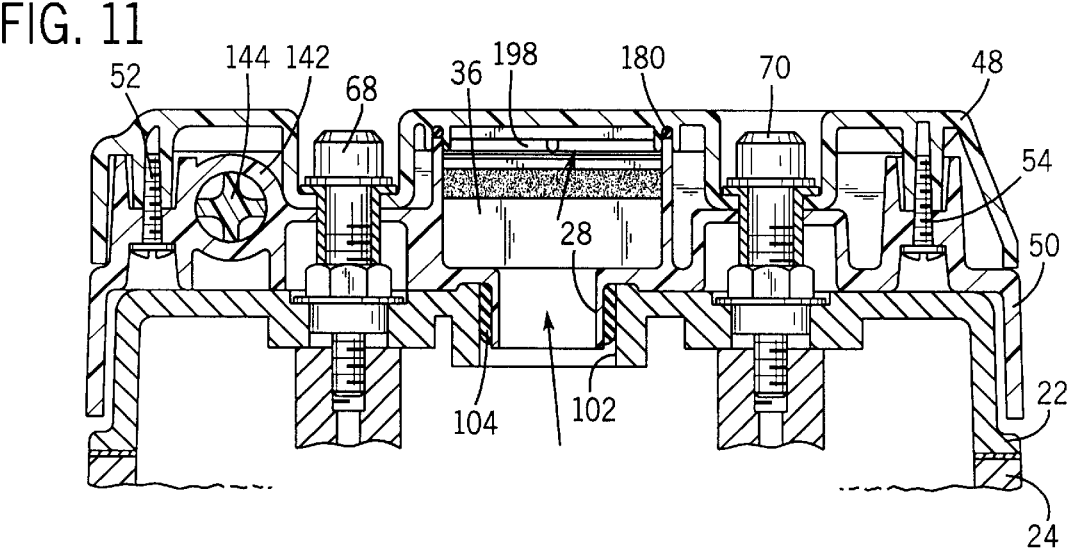
FIG. 11 is a sectional view taken along line 11—11 of FIG. 4.
Figure 14:
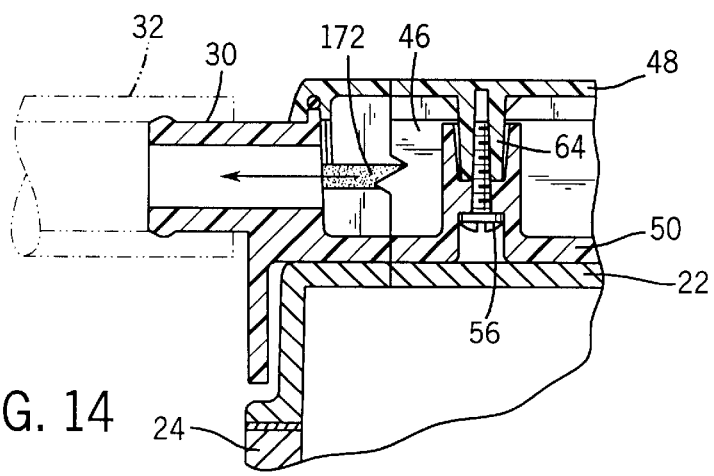
FIG. 14 is a sectional view taken along line 14—14 of FIG. 4.
Figure 17:
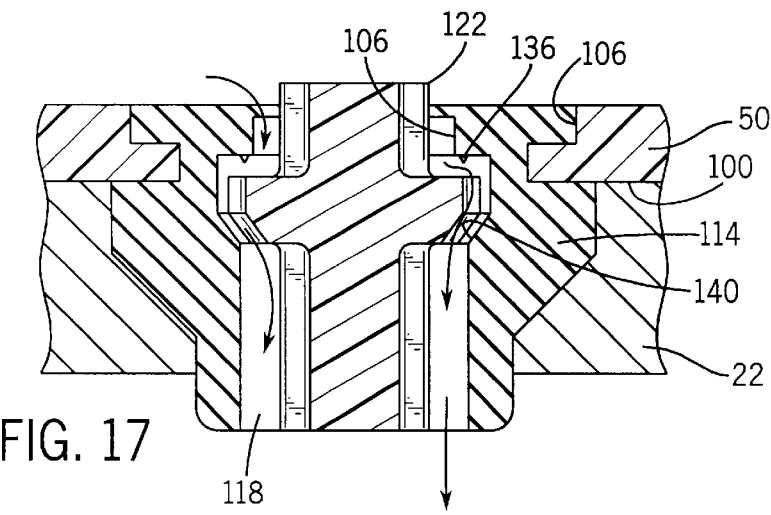
FIG. 17 is a sectional view taken along line 17—17 of FIG. 16.

Lower housing section 50 of flat low profile filter housing 26 has a lower surface 100 with an opening 28 therethrough providing the noted inlet. Valve cover 22 has an opening 102 in its upper surface 66 mating with opening 28 of lower surface 100 of the filter housing in sealed relation at rubber grommet 104, FIG. 11, and providing a direct inlet passage for transmission of oil and air from the diesel engine to filter housing 26. Lower surface 100 of lower housing section 50 of flat low profile filter housing 26 has second and third openings 106 and 108 therethrough, FIGS. 3 and 4. Upper surface 66 of valve cover 22 has second and third openings 110 and 112 therethrough mating with respective openings 106 and 108 in lower surface 100 of the filter housing in sealed relation at respective rubber grommets 114 and 116, FIGS. 17 and 12, respectively, and providing direct drain passages 118 and 120 for transmission of separated oil from filter housing 26 back to the diesel engine.

Figure 19:
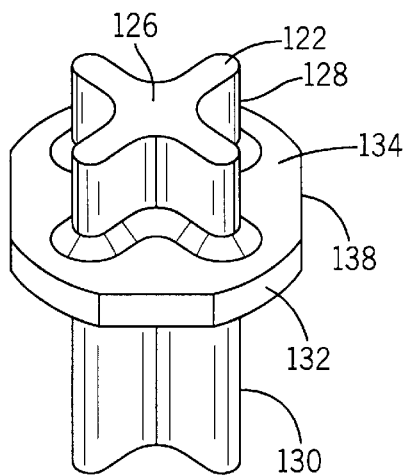
FIG. 19 is a perspective view of the drain valve plunger of FIGS. 17 and 18.
Figure 18:
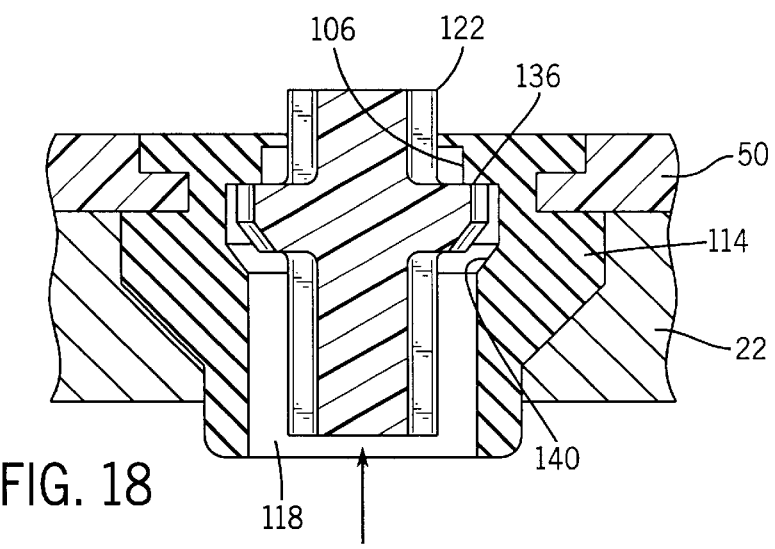
FIG. 18 is like FIG. 17 and shows another position of the drain valve.

Drain valves 122 and 124, FIG. 3, are provided in respective drain passages 118 and 120. Each drain valve has a lower open position, FIGS. 12 and 17, permitting flow of separated oil from low profile filter housing 26 back to the diesel engine. Each drain valve has an upper closed position, FIGS. 13 and 18, blocking the noted flow. Each drain valve is gravity biased to the noted lower open position. Each drain valve is moved to the noted upper closed position by pressure in valve cover 22 during operation of the diesel engine. Each drain valve includes a gravity biased vertically reciprocal plunger 126, FIG. 19, with upper and lower cross-shaped stalks 128 and 130 guiding plunger movement within the grommet such as 114 and permitting flow therealong between the spokes of the cross-member. A central flange 132 has an upper surface 134 abutting grommet shoulder seal bead surface 136, FIG. 18, in the closed position of the valve and providing a seal thereagainst. The outer perimeter of flange 134 has cut-out sections 138 permitting flow therepast in the downward open position of the valve, FIG. 17, including when flange 132 rests against frusto-conical surface 140 of grommet 114.

Figure 12:
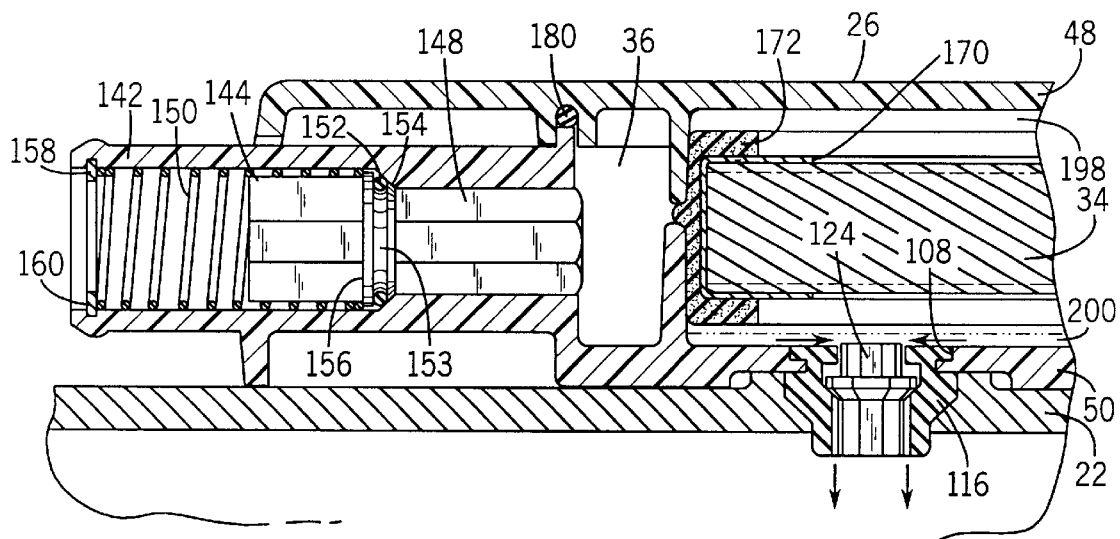
FIG. 12 is a sectional view taken along line 12—12 of FIG. 4.
Figure 13:
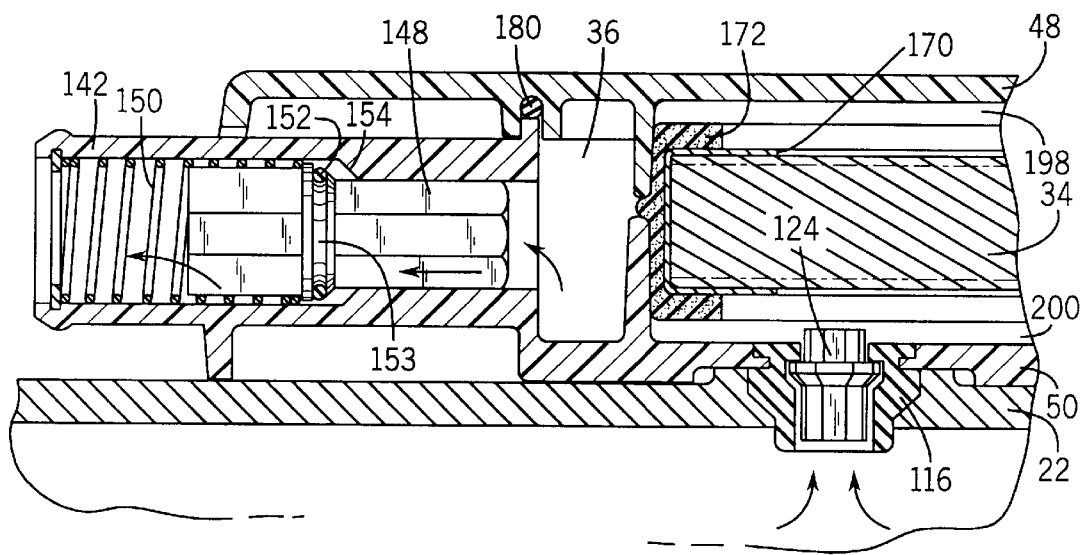
FIG. 13 is like FIG. 12 and shows another position of the bypass valve.
Figure 16:
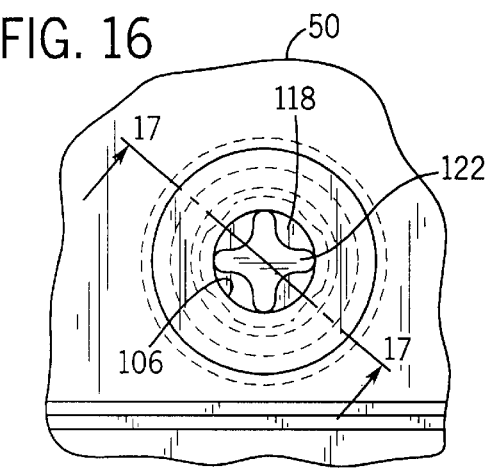
FIG. 16 is an enlarged top view of a portion of FIG. 4 as shown at line 16—16.

Flat low profile filter housing 26 has a bypass port 142, FIG. 3, formed in lower housing section 50 and communicating with inlet 28 through intake plenum 36. A bypass valve 144 is provided in bypass port 142. Bypass valve 144 has a normally closed position, FIG. 12, such that oil and air from inlet 28 and intake plenum 36 flow to top face 40 of flat panel filter element 34. Bypass valve 144 has a pressure actuated open position, FIG. 13, passing the oil and air therethrough as an alternate path, for example, through hose 146 to atmosphere. The bypass valve is actuated to the open position in response to a predetermined pressure drop across flat panel filter element 34 between upper and lower faces 40 and 42. Bypass valve 144 includes a reciprocal plunger 148, FIG. 12, biased to the noted closed position, which is rightwardly as shown in FIG. 12, by a calibration spring 150 supplying bias. The bias of calibration spring 150 is overcome at the noted predetermined pressure drop, which is sensed as backpressure in intake plenum 36, which causes leftward compression of spring 150 as shown in FIG. 13. In the closed position of the valve FIG. 12, O-ring 152 carried in annular groove 153 on plunger 148 is seated against frusto-conical surface 154 in bypass port 142 in sealing relation. In the noted open position, FIG. 13, plunger 148 moves leftwardly, and O-ring 152 moves away from frusto-conical sealing surface 154 to permit flow of oil and air therepast. Spring 150 bears at its rightward end against plunger shoulder 156, and at its leftward end against C-shaped stop ring 158 held in annular groove 160 in the bypass port.

Figure 15:
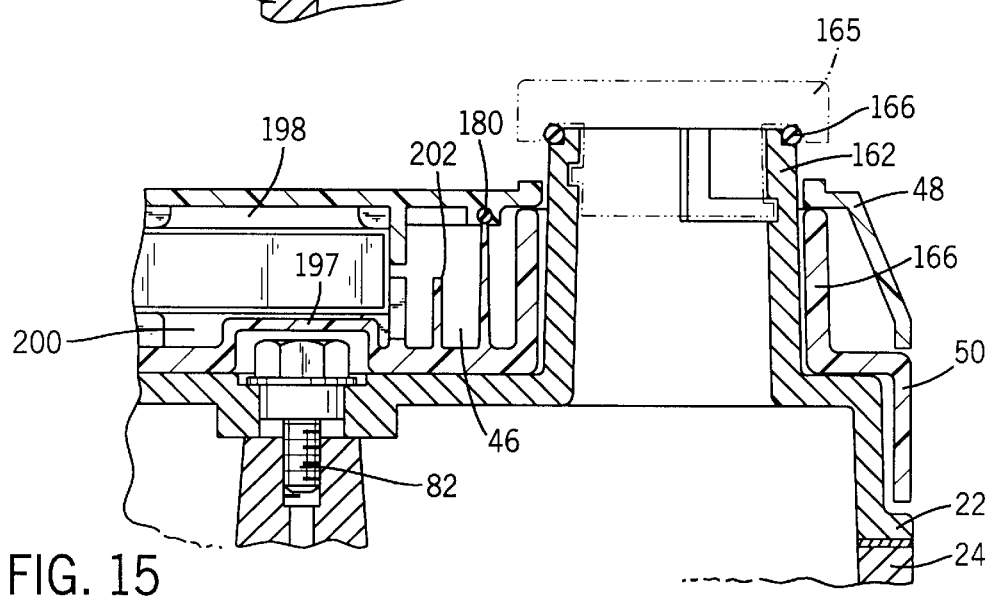
FIG. 15 is a sectional view taken along line 15—15 of FIG. 4.

An oil fill tube 162, FIG. 2, extends through flat low profile filter housing 26 and communicates with the interior of valve cover 22 to provide an oil fill inlet for adding oil to the diesel engine. Housing 26 has an opening 164 therethrough through which oil fill tube 162 extends in isolation from flat panel filter element 34. Oil fill tube 162 is closed by cap 165 sealed at O-ring 166, FIG. 15. Oil fill tube 162 is integrally formed with and extends from valve cover 22 through opening 164 in housing 26. Opening 164 in the housing is formed by cylinder 167 integrally formed with and extending upwardly from lower housing section 50 to upper housing section 48 at aperture 168. Oil fill tube 162 extends along a generally vertical direction perpendicular to the horizontal plane of flat low profile filter housing 26 and parallel to the vertical direction of oil and air flow through inlet 28.

Flat panel filter element 34 has the noted upper and lower distally opposite facing planar faces 40 and 42. Upper face 40 communicates with inlet 28 through intake plenum 36. Lower face 42 communicates with outlet 30 through exit plenum 46. Faces 40 and 42 span along the plane of flat panel filter element 34 between left and right distally opposite ends 38 and 44. Inlet 28 and bypass port 142 are adjacent left end 38 of flat panel filter element 34. Outlet 30 and oil fill tube 162 are adjacent right end 44 of flat panel filter element 34. The direction of flow of oil and air through inlet 28 is generally upward and vertical, and perpendicular to the horizontal plane of flat panel filter element 34, as noted. The direction of oil and air flow through bypass port 142 is generally horizontal and in the plane of flat panel filter element 34 and perpendicular to the noted direction of oil and air flow through inlet 28. The direction of air flow through outlet 30 is generally horizontal and in the plane of flat panel filter element 34 and perpendicular to the noted direction of oil and air flow through bypass port 142 and perpendicular to the noted direction of oil and air flow through inlet 28. The direction of separated oil drain through ports 106 and 108 is generally vertically downward and perpendicular to the horizontal plane of flat panel filter element 34 and parallel and in the opposite direction to the noted direction of flow of oil and air through inlet 28 and perpendicular to the noted direction of oil and air flow through bypass port 142 and perpendicular to the noted direction of air flow through outlet 30.

Flat panel filter element 34 includes one or more layers of depth media between upper and lower screens at the noted upper and lower faces 40 and 42, supported and bound between a metal end cap 170 around the perimeter thereof. Around the outside of end cap 170 is a soft rubber or open cell urethane gasket 172, FIG. 6. Upper and lower housing sections 48 and 50 mate in assembled condition to define an outer border fence 174, FIG. 3, and an inner border fence 176. Outer border fence 174 is provided by a wall 177 extending upwardly from lower housing section 50 and mating with the upper housing section 48 at groove 178 therein and sealed thereto at shaped sealing gasket 180. Inner border fence 176 is formed by partial height wall 182 extending upwardly from lower housing section 50, and partial height wall 184 extending downwardly from upper housing section 48, and facing each other across a small gap 186, FIG. 6 gripping and pinching and bulging a portion 188 of gasket 172 therebetween in sealing relation, to seal the border of flat panel filter element 34. Upper and lower housing sections 48 and 50 mate to define the noted border fences such that flow from inlet 28 to outlet 30 is only through flat panel filter element 34 within inner fence 176. Outer border fence 174 defines intake plenum 36 at inlet 28 adjacent left end 38 of flat panel filter element 34. Oil and air flows upwardly through inlet 28 into intake plenum 36 and around left end 38 of flat panel filter element 34 to upper face 40 thereof. Outer border face 174 defines exit plenum 46 at outlet 30 adjacent right end 44 of flat panel filter element 34 such that air flows from lower face 42 of flat panel filter element 34 into exit plenum 46 and through outlet 30. In a further embodiment, sealing may also be enhanced by tapering walls 182 and 184. In FIG. 7, wall 184 is tapered rightwardly as it extends downwardly from upper housing section 48. Wall 182 is tapered rightwardly as it extends upwardly from lower housing section 50. This enhances the seal against gasket 172 along such taper. This also provides a guided lead-in of element 34 into the receiving pocket formed by such walls.

Upper housing section 48 has a plurality of downwardly extending central stand-offs 190, FIG. 3, and perimeter stand-offs 192. Lower housing section 50 has a plurality of upwardly extending central stand-offs 194 and perimeter stand-offs 196. Upper face 40 of flat panel filter element 34 faces upper housing section 48 and is separated therefrom by stand-offs 190 and 192 to define an upper gap 198, FIG. 5, therebetween for flow of oil and air. Lower face 142 of flat panel filter element 34 faces and is separated from lower housing section 50 by stand-offs 194 and 196 to define a lower gap 200 therebetween for exiting air flow. Additional lower stand-offs 197 extend upwardly from lower surface 100 of lower housing section 50 to engage the underside of flat panel filter element 34. These latter stand-offs 197 cover bolts 82 and 84. Lower housing section 50 has a diverter wall 202, FIGS. 3–7, extending upwardly therefrom in exit plenum 46 adjacent right end 44 of flat panel filter element 34 to divert air from lower gap 200 upwardly into exit plenum 46 as shown at arrow 204, FIGS. 5 and 7, before passage to outlet 30.

Left wall 206, FIG. 3, of upper portion 184 of inner fence 176 has an inlet cut-out section 208 therein at left end 38 of flat panel filter element 34 for passage of oil and air therethrough from intake plenum 36 to upper gap 198. Right wall 210 of lower portion 182 of inner fence 176 has an outlet cut-out section 212 therein at right end 44 of flat panel filter element 34 for passage of air therethrough from lower gap 200 to exit plenum 46. Oil and air flow from intake plenum 36 through inlet cut-out section 208 of upper fence portion 184 of inner fence 176 as shown in FIGS. 5 and 6 at arrows 214 and 216. The flow of oil and air downwardly through filter element 34 is shown at arrow 218 in FIGS. 6 and 7. The flow of air from lower gap 200 through lower cut-out section 212 in lower portion 182 of inner fence 176 is shown at arrows 220 and 222 in FIGS. 5 and 6, and then at arrow 204 upwardly and over diverter wall 202 and into exit plenum 46.

Inlet opening 28 in lower surface 100 of lower housing section 50 is within outer border fence 174 but outside of inner border fence 176. Drain port openings 106 and 108 in lower surface 100 of lower housing section 50 are each within inner border fence 176. Inner border fence 176 circumscribes flat panel filter element 34 and upper and lower gaps 198 and 200. Outer border fence 174 circumscribes inner border fence 176 and defines intake plenum 36 between inner and outer border fences 176 and 174, and defines exit plenum 46 between inner and outer border fences 176 and 174. Outlet 30 is provided through wall 177 of outer border fence 174 at exit plenum 46. Bypass port 142 is provided through outer border fence 174 at the intake plenum.

It is recognized that various equivalents, alternatives and modifications are possible within the scope of the appended claims.

What is claimed is:

1. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said diesel engine comprises a valve cover and wherein said flat low profile filter housing is mounted to said valve cover, and wherein said flat low profile filter housing has a lower surface with a first opening therethrough providing said inlet, said valve cover has an upper surface with a first opening therethrough mating with said first opening of said lower surface of said flat low profile filter housing in sealed relation and providing a direct inlet passage for transmission of said oil and air from said diesel engine to said flat low profile filter housing, and wherein said lower surface of said flat low profile filter housing has a second opening therethrough, said upper surface of said valve cover has a second opening therethrough mating with said second opening of said lower surface of said flat low profile filter housing in sealed relation and providing a direct drain passage for transmission of separated said oil from said flat low profile filter housing to said diesel engine.

2. The invention according to claim 1 comprising a drain valve in said drain passage through said second openings of said lower surface of said flat low profile filter housing and said upper surface of said valve cover, said drain valve having a lower open position permitting flow of said separated oil from said flat low profile filter housing to said diesel engine, said drain valve having an upper closed position blocking said flow, said drain valve being gravity biased to said lower open position, said drain valve being moved to said upper closed position by pressure in said valve cover during operation of said diesel engine.

3. The invention according to claim 1 wherein said housing has a bypass port communicating with said inlet and said flat panel filter element, and comprising:

a drain valve comprising a gravity biased reciprocal plunger in said drain passage through said second openings in said lower surface of said flat low profile filter housing and said upper surface of said valve cover, said gravity biased reciprocal plunger having a lower open position permitting flow of said separated oil from said flat low profile filter housing to said diesel engine, said gravity biased reciprocal plunger having an upper closed position blocking said flow, said plunger being moved to said lower open position by gravity, said plunger being moved to said upper closed position by pressure in said valve cover during operation of said diesel engine;

a bypass valve in said bypass port, said bypass valve comprising a spring biased reciprocal plunger having a normally closed position such that oil from said inlet flows to said flat panel filter element, said spring biased reciprocal plunger having a pressure actuated open position passing said oil and air therethrough as an alternate path, said spring biased reciprocal plunger being moved to said open position against the spring bias in response to a predetermined pressure drop across said flat panel filter element.

4. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat low profile filter housing has a bypass port communicating with said inlet, and a bypass valve in said bypass port, said bypass valve having a normally closed position such that said oil and air from said inlet flows to said flat panel filter element, said bypass valve having a pressure actuated open position passing said oil and air therethrough as an alternate path, said bypass valve being actuated to said open position in response to a predetermined pressure drop across said flat panel filter element.

5. The invention according to claim 4 wherein said bypass valve comprises a reciprocal plunger biased to said closed position by a calibration spring supplying bias which is overcome at said predetermined pressure drop.

6. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said diesel engine comprises a valve cover and wherein said flat low profile filter housing is mounted to said valve cover, and comprising an oil fill tube extending through said flat low profile filter housing and communicating with the interior of said valve cover to provide an oil fill inlet for adding oil to said diesel engine.

7. The invention according to claim 6 wherein said flat low profile filter housing has an opening therethrough through which said oil fill tube extends in isolation from said flat panel filter element.

8. The invention according to claim 7 wherein said oil fill tube is integrally formed with and extends from said valve cover through said opening in said flat low profile filter housing.

9. The invention according to claim 6 wherein said oil and air flows through said inlet along a first direction perpendicular to the plane of said flat low profile filter housing, said oil fill tube extends along a second direction perpendicular to the plane of said flat low profile filter housing, and wherein said first and second directions are parallel.

10. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and comprising a bypass port in said flat low profile filter housing, and wherein said bypass port and said inlet are both adjacent said first end of said flat panel filter element.

11. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, wherein said oil fill tube and said outlet are both adjacent said second end of said flat panel filter element.

12. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and comprising a bypass port in said housing, and wherein said bypass port is adjacent said first end of said flat panel filter element, and said outlet is adjacent said second end of said flat panel filter element.

13. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, and wherein said inlet is adjacent to said first end of said flat panel filter element, and said oil fill tube is adjacent said second end of said flat panel filter element.

14. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, and comprising a bypass port in said flat low profile filter housing, wherein said bypass port is adjacent said first end of said flat panel filter element, and said oil fill tube is adjacent said second end of said flat panel filter element.

15. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and comprising a bypass port in said flat low profile filter housing, and wherein said bypass port and said inlet are both adjacent said first end of said flat panel filter element, and said outlet is adjacent said second end of said flat panel filter element.

16. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, and comprising a bypass port in said flat low profile filter housing, wherein said bypass port and said inlet are both adjacent said first end of said flat panel filter element, and said oil fill tube is adjacent said second end of said flat panel filter element.

17. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, wherein said oil fill tube and said outlet are both adjacent said second end of said flat panel filter element, and said inlet is adjacent said first end of said flat panel filter element.

18. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, and comprising a bypass port in said flat low profile filter housing, wherein said oil fill tube and said outlet are both adjacent said second end of said flat panel filter element, and said bypass port is adjacent said first end of said flat panel filter element.

19. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said diesel engine comprises a valve cover, and said flat low profile filter housing is mounted to said valve cover, and comprising an oil fill tube extending through said flat low profile filter housing and communicating with the interior of said valve cover to provide an oil fill inlet for adding oil to said diesel engine, and comprising a bypass port in said flat low profile filter housing, wherein said bypass port and said inlet are both adjacent said first end of said flat panel filter element, and said oil fill tube and said outlet are both adjacent said second end of said flat panel filter element.

20. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said housing has a drain port draining separated said oil, and wherein the flow of said oil and air through said inlet is along a first direction, and the flow of oil through said drain port is along a second direction which is opposite and parallel to said first direction, and wherein each of said first and second directions is perpendicular to the plane of said flat panel filter element.

21. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat low profile filter housing has a drain port draining separated said oil, and wherein the flow of oil and air through said inlet is along a first direction, the flow of oil through said drain port is along a second direction, and the flow of air through said outlet is along a third direction, said first and second directions being parallel to each other, and said third direction being perpendicular to each of said first and second directions, wherein each of said first and second directions is perpendicular to the plane of said flat panel filter element, and said third direction lies in the plane of said flat panel filter element, and wherein said flat low profile filter housing has a bypass port communicating with said inlet and said flat panel filter element and providing an alternate flow path for said oil and air therethrough along a fourth direction, wherein said fourth direction is perpendicular to each of said first and second directions and lies in the plane of said flat panel filter element.

22. The invention according to claim 21 wherein said fourth direction is perpendicular to said third direction.

23. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, and wherein said oil and air flows from said inlet around said first end of said flat panel filter element to said first face thereof.

24. A diesel engine crankcase ventilation filter comprising a flat low profile filter housing having an inlet receiving oil and air from said diesel engine, and an outlet returning air to said diesel engine, a flat panel filter element in said housing receiving said oil and air from said inlet, separating said oil from said air, and passing said air to said outlet, wherein said flat panel filter element has first and second distally opposite facing planar faces, said first face communicating with said inlet, said second face communicating with said outlet, said faces spanning along the plane of said flat panel filter element between first and second distally opposite ends, wherein said housing comprises upper and lower generally planar sections mating to define a border fence around the perimeter of said flat panel filter element in sealing relation such that flow from said inlet to said outlet is only through said flat panel filter element within said fence, wherein said fence defines an intake plenum at said inlet and adjacent said first end of said flat panel filter element, such that oil and air flows through said inlet into said intake plenum and around said first end of said flat panel filter element to said first face thereof, and wherein said fence defines an exit plenum at said outlet and adjacent said second end of said flat panel filter element such that air flows from said second face of said flat panel filter element into said exit plenum and through said outlet, and wherein said upper housing section has a plurality of downwardly extending stand-offs, and said lower housing section has a plurality of upwardly extending stand-offs, wherein said first face of said flat panel filter element faces said upper housing section and is separated therefrom by said stand-offs of said upper housing section to define an upper gap therebetween for flow of oil and air, and wherein said second face of said flat panel filter element faces and is separated from said lower housing section by said stand-offs of said lower housing section to define a lower gap therebetween for exiting air flow.

25. The invention according to claim 24 wherein said lower housing section has a diverter wall extending upwardly therefrom in said exit plenum adjacent said second end of said flat panel filter element to divert air from said lower gap upwardly into said exit plenum before passage to said outlet.

26. The invention according to claim 24 wherein said fence has an inlet cut-out section therein at said first end of said flat panel filter element for passage of oil and air therethrough from said intake plenum to said upper gap, and wherein said fence has an outlet cut-out section therein at said second end of said flat panel filter element for passage of air therethrough from said lower gap to said exit plenum.

27. The invention according to claim 26 wherein said fence is formed by upper and lower fence portions, said upper fence portion extending downwardly from said upper housing section, said lower fence portion extending upwardly from said lower housing section, said inlet cut-out section of said fence at said first end of said flat panel filter element being formed in said upper fence portion, said outlet cut-out section of said fence being formed in said lower fence portion at said second end of said flat panel filter element.

28. A diesel engine crankcase ventilation filter having minimum space and plumbing requirements, comprising a housing having an inlet for receiving oil and air from said diesel engine, and an outlet returning air to said diesel engine, a filter element in said housing receiving said oil and air from said inlet, separating said oil from said air, and passing said air to said outlet, said housing having a drain draining separated said oil to said diesel engine, said housing being mounted to said diesel engine such that said oil and air flow upwardly from said engine into said housing, and said separated oil flows downwardly out of said housing to said diesel engine, said housing having an intake plenum directing oil and air from said inlet to said filter element such that said oil and air flow downwardly through said filter element, wherein said housing is a flat low profile filter housing and said filter element is a flat panel filter element having an upper surface and a lower surface, said flat low profile filter housing having an upper section spaced from said upper surface of flat panel filter element by an upper gap permitting flow of said oil and air therethrough, said flat low profile filter housing having a lower section separated from said lower surface of said flat panel filter element by a lower gap permitting flow of air therethrough to said outlet, wherein said flat low profile filter housing includes a border fence extending around the perimeter of said flat panel filter element in sealing relation such that flow from said inlet to said outlet is only through said flat panel filter element said flat panel filter element being within said border fence, and wherein said lower housing section has a first opening therethrough providing said inlet communicating with said intake plenum, said intake plenum directing oil and air from said inlet to said upper gap between said upper housing section and said upper surface of said flat panel filter element, said first opening being outside of said border fence, and wherein said lower housing section has a second opening therethrough providing said drain communicating with said lower gap between said lower housing section and said lower surface of said flat panel filter element, said second opening being within said border fence.

29. A diesel engine crankcase ventilation filter having minimum space and plumbing requirements, comprising a housing having an inlet for receiving oil and air from said diesel engine, and an outlet returning air to said diesel engine, a filter element in said housing receiving said oil and air from said inlet, separating said oil from said air, and passing said air to said outlet, said housing having a drain draining separated said oil to said diesel engine, said housing being mounted to said diesel engine such that said oil and air flow upwardly from said engine into said housing, and said separated oil flows downwardly out of said housing to said diesel engine, said housing having an intake plenum directing oil and air from said inlet to said filter element such that said oil and air flow downwardly through said filter element, wherein said housing is a flat low profile filter housing and said filter element is a flat panel filter element having an upper surface and a lower surface, said flat low profile filter housing having an upper section spaced from said upper surface of flat panel filter element by an upper gap permitting flow of said oil and air therethrough, said flat low profile filter housing having a lower section separated from said lower surface of said flat panel filter element by a lower gap permitting flow of air therethrough to said outlet, wherein said flat low profile filter housing includes a border fence extending around the perimeter of said flat panel filter element in sealing relation such that flow from said inlet to said outlet is only through said flat panel filter element, said flat panel filter element being within said border fence, and wherein said border fence comprises an inner border fence circumscribing said flat panel filter element and said upper and lower gaps, and comprising an outer border fence circumscribing said inner border fence and defining said intake plenum between said inner and outer border fences, and defining an exit plenum between said inner and outer border fences, said intake plenum directing oil and air from said inlet to said upper gap, said exit plenum directing air from said lower gap to said outlet.

30. The invention according to claim 29 wherein said lower housing section has a first opening therethrough providing said inlet communicating with said intake plenum, said lower housing section has a second opening therethrough providing said drain communicating with said lower gap, said first opening being inside of said outer border fence and outside of said inner border fence, said second opening being inside of said inner border fence.

31. The invention according to claim 30 wherein said outlet is provided through said outer border fence at said exit plenum.

32. The invention according to claim 31 comprising a bypass port provided through said outer border fence at said intake plenum and communicating with said inlet and said upper gap.

* * * * *